(12) United States Patent
Rammer et al.

(10) Patent No.: US 10,267,238 B2
(45) Date of Patent: Apr. 23, 2019

(54) ENGINE BRAKING DEVICE FOR A COMBUSTION ENGINE AND METHOD FOR OPERATING AN ENGINE BRAKING DEVICE

(71) Applicant: MAN Truck & Bus Österreich AG, Steyr (AT)

(72) Inventors: Franz Rammer, Wolfern (AT); Gottfried Raab, Perg (AT); Heidrun Klinger, Steyr (AT); Franz Leitenmayr, Perg (AT)

(73) Assignee: MAN TRUCK & BUS ÖSTERREICH AG, Steyr (AT)

( * ) Notice: Subject to any disclaimer, the term of this patent is extended or adjusted under 35 U.S.C. 154(b) by 0 days.

(21) Appl. No.: 14/966,553

(22) Filed: Dec. 11, 2015

(65) Prior Publication Data
US 2016/0169128 A1  Jun. 16, 2016

(30) Foreign Application Priority Data

Dec. 15, 2014  (AT) .................................. A 908/2014

(51) Int. Cl.
  *F02D 23/00*  (2006.01)
  *F02D 13/04*  (2006.01)
  (Continued)

(52) U.S. Cl.
  CPC .............. *F02D 13/04* (2013.01); *F01L 13/06* (2013.01); *F01N 13/10* (2013.01); *F02B 37/02* (2013.01);
  (Continued)

(58) Field of Classification Search
  CPC .. F02D 13/04; F02D 9/06; F02B 37/02; F02B 37/18; F02M 26/05; F01N 13/10; F01N 2240/36; F01N 2340/06; Y02T 10/144
  (Continued)

(56) References Cited

U.S. PATENT DOCUMENTS 3,423,926 A  *  1/1969  Holzhausen ............ F01D 9/026
                                                       60/602
3,591,959 A  *  7/1971  Kubis ................... F02B 37/025
                                                       123/323
(Continued)

FOREIGN PATENT DOCUMENTS

AT        512332 A1    7/2013
DE    19808832 A1    9/1999
(Continued)

*Primary Examiner* — Thai Ba Trieu
(74) *Attorney, Agent, or Firm* — Lucas & Mercanti, LLP

(57) ABSTRACT

The invention relates to an engine braking device for a combustion engine in motor vehicles, which has an intake system, an exhaust system, gas exchange valves associated with the combustion engine, an exhaust turbocharger integrated into the exhaust system and the intake system, and an engine braking unit, wherein the engine braking unit has a decompression brake, which influences at least one outlet valve of the gas exchange valves, and a brake flap, which is arranged in the exhaust system and causes the exhaust gas to build up. The brake flap is arranged upstream of and outside, preferably directly upstream of and outside, a turbine housing of an exhaust turbine of the exhaust turbocharger and is designed as a flow guiding flap which influences the admission of a gas flow to the exhaust turbine. The invention also relates to a method for operating an engine braking device.

3 Claims, 7 Drawing Sheets

(51) Int. Cl.
   *F01N 13/10* (2010.01)
   *F02B 37/02* (2006.01)
   *F02D 9/06* (2006.01)
   *F01L 13/06* (2006.01)
   *F02M 26/05* (2016.01)

(52) U.S. Cl.
   CPC ............ *F02D 9/06* (2013.01); *F01N 2240/36* (2013.01); *F01N 2340/06* (2013.01); *F02M 26/05* (2016.02); *Y02T 10/144* (2013.01)

(58) Field of Classification Search
   USPC .................. 60/602, 605.2; 123/321–323
   See application file for complete search history.

(56) References Cited

U.S. PATENT DOCUMENTS

| | | |
|---|---|---|
| 5,150,678 A | 9/1992 | Wittmann |
| 5,839,281 A * | 11/1998 | Sumser ............... F02D 9/06 60/602 |
| 6,155,049 A | 12/2000 | Bischoff |
| 6,625,986 B2 * | 9/2003 | Mazaud ............... F02D 9/06 60/602 |
| 7,523,736 B2 | 4/2009 | Rammer |
| 8,069,650 B2 * | 12/2011 | Alm ................ F02D 41/0055 60/605.2 |
| 8,225,769 B2 | 7/2012 | Dilly |
| 8,549,855 B2 * | 10/2013 | Mayr ................. F02D 9/06 60/605.2 |
| 8,931,456 B2 | 1/2015 | Rammer et al. |
| 9,546,592 B2 * | 1/2017 | Lingens ............... F02B 37/22 |
| 2003/0178002 A1 | 9/2003 | Israel |
| 2011/0000208 A1 * | 1/2011 | Robinson ............ F02B 37/18 60/602 |
| 2011/0041496 A1 * | 2/2011 | Mayr ................ F02D 13/04 60/611 |
| 2013/0213350 A1 * | 8/2013 | Watanabe ........ F02D 41/0007 123/327 |
| 2013/0255624 A1 * | 10/2013 | Chaves ............ F02D 13/04 123/321 |
| 2014/0214308 A1 * | 7/2014 | Mulloy ............... F02D 9/06 701/110 |
| 2016/0169167 A1 * | 6/2016 | Kuenzel ............ F01N 13/107 60/605.2 |
| 2018/0119625 A1 * | 5/2018 | Dane ............... F02D 41/0007 |

FOREIGN PATENT DOCUMENTS

| | | | |
|---|---|---|---|
| DE | 10239110 A1 * | 3/2004 | ............. F02B 37/18 |
| DE | 102006058102 A1 * | 6/2008 | ............ F02B 37/183 |
| EP | 1258603 A1 | 11/2002 | |
| EP | 1710415 A1 * | 10/2006 | ............. F02B 37/18 |
| EP | 1801392 A2 | 6/2007 | |
| EP | 2412955 A1 | 2/2012 | |
| EP | 2607650 A2 * | 6/2013 | ............. F02B 37/22 |
| EP | 2634393 A2 | 9/2013 | |
| WO | WO 2011002565 A1 * | 1/2011 | ............... F02D 9/06 |
| WO | WO 2013045063 A2 * | 4/2013 | ............. F02B 37/18 |

* cited by examiner

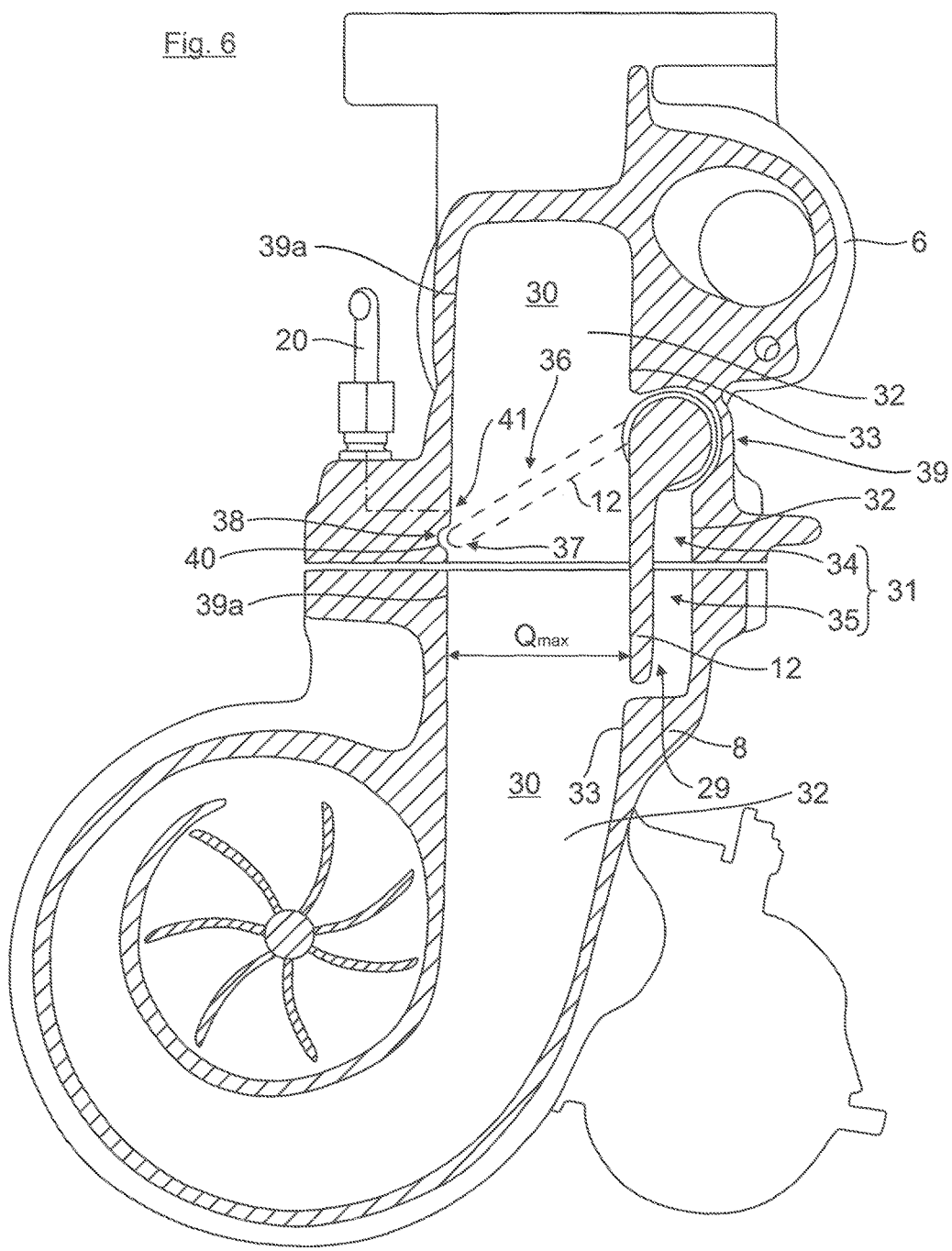

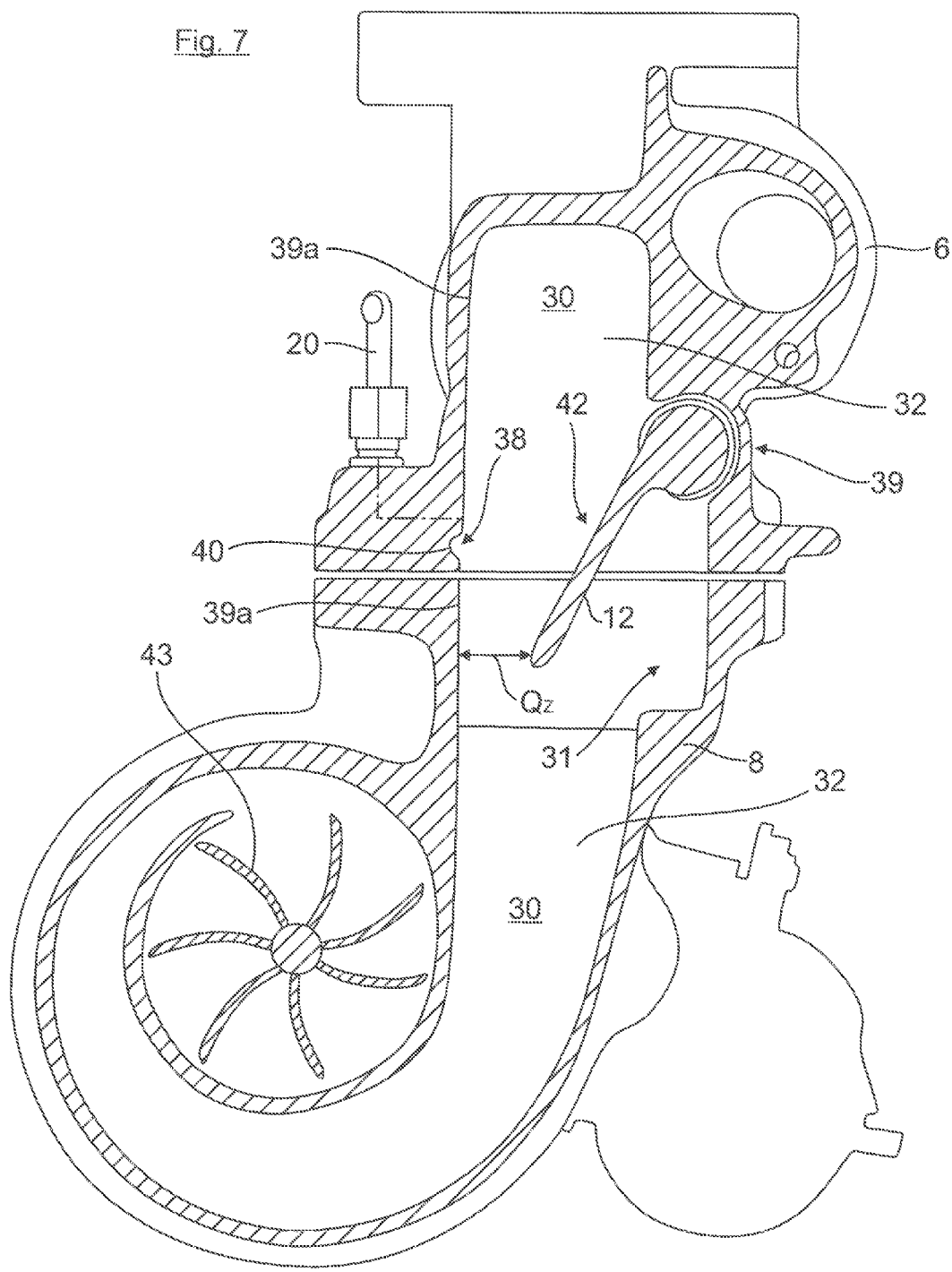

ENGINE BRAKING DEVICE FOR A COMBUSTION ENGINE AND METHOD FOR OPERATING AN ENGINE BRAKING DEVICE

CROSS-REFERENCE TO RELATED APPLICATIONS

The present application claims priority of A 908/2014 filed Dec. 15, 2014, which is incorporated herein by reference.

BACKGROUND OF THE INVENTION

The present invention relates to an engine braking device for a combustion engine in motor vehicles, in particular in commercial vehicles. The invention furthermore relates to a method and to a vehicle having the engine braking device.

In air-compressing (diesel) combustion engines in commercial vehicles, there is a known practice of producing an exhaust gas backpressure in the exhaust system by a brake flap in the overrun mode, the backpressure bringing about effective engine braking since the pistons of the combustion engine operate against this exhaust gas pressure during the exhaust stroke (outlet valves open).

In order to significantly increase the effect of such an engine braking device, there is a widely known practice of additionally providing a decompression brake, where, in addition to regular valve actuation in accordance with the four-stroke principle, the outlet valves are also partially open during the compression stroke. Here, the additional braking effect arises from the throttled discharge of the combustion air into the exhaust system.

The decompression brake can be either exhaust-controlled or positively controlled. In exhaust-controlled operation, the valve timing of the outlet valves is configured in such a way that the outlet valves open irregularly in a specifically intended manner owing to the exhaust gas backpressure present when the brake flap is closed ("valve jumping") and are held open by a mechanism until the next regular valve opening.

In the case of a positively controlled decompression brake, interventions are generally made into the regular valve timing by hydraulic and mechanical means in order to hold the outlet valves partially open in a specifically intended manner, at least also during the compression stroke.

For example, AT 512 332 A1 discloses a throttling device integrated into the exhaust turbine for the open-loop and/or closed-loop control of an engine braking mode, in which a brake flap in the housing of the exhaust turbine is inserted into the rotor mounting space accommodating a turbine rotor directly in the region of the mouth of an inflow duct of the exhaust turbine. A measure of this kind requires design modifications to the turbine structure and is therefore relatively expensive.

BRIEF SUMMARY OF THE PRESENT INVENTION

An object of the invention is to provide an engine braking device for a combustion engine in motor vehicles, in particular in commercial vehicles, that increases the engine braking power of a combustion engine with exhaust turbocharging over the prior art in a manner which is simple in terms of design and is functionally reliable, wherein the temperature loading of the combustion engine in the engine braking mode should be kept as low as possible.

According to an embodiment of the invention an engine braking device for a combustion engine in motor vehicles, in particular in commercial vehicles, includes an intake system, an exhaust system, gas exchange valves (preferably controlled by the four-stroke principle) associated with the combustion engine, an exhaust turbocharger integrated into the exhaust system and the intake system, and an engine braking unit, wherein the engine braking unit has a decompression brake, which influences at least one outlet valve of the gas exchange valves, and a brake flap, which is arranged in the exhaust system and causes the exhaust gas to build up. According to the embodiment, the brake flap is arranged upstream of and outside, preferably directly upstream of and outside, a turbine housing of an exhaust turbine of the exhaust turbocharger (and therefore upstream of an inflow duct of the turbine housing) and is designed as a flow guiding flap which (positively) influences the admission of gas to the exhaust turbine. It is thus possible, virtually without any additional outlay on construction, to greatly increase the inlet-side boost pressure in the engine braking mode and thus to increase the mass flow required in the combustion engine for the achievable braking power. The brake flap thus performs several functions simultaneously: it ensures, preferably under closed-loop control, a sufficient exhaust gas backpressure and additionally ensures advantageous inflow to the turbine with a reduced exhaust gas flow rate and lower exhaust gas enthalpy, similarly to the operation of a control flap on exhaust turbines with variable turbine geometry.

More specifically, in contrast to a brake flap arranged downstream of the exhaust turbine, the brake flap arranged upstream of the exhaust turbine here brings about a higher pressure gradient across the exhaust turbine, as a result of which, due to the higher mass flow and volume flow which is then possible through the exhaust turbine, the boost pressure and the exhaust gas backpressure can be significantly increased and thus also the engine braking power can be significantly increased in a functionally reliable manner without thermal overloading of the combustion engine. By virtue of the pressure gradient across the brake flap arranged upstream, lower loading of the exhaust turbine is achieved here for the same exhaust gas backpressure, and hence this leads to the desired increase in braking power with an increase in the exhaust gas backpressure, without higher loading of the exhaust turbine.

The number of brake flaps preferably depends on the number of flows of the exhaust turbine, and therefore, in the case of multi-flow configurations, each flow is then assigned a dedicated brake flap, with two brake flaps being provided in the case of a double-flow configuration, for example. In principle, these can be actuated simultaneously, being arranged on a common shaft and thus being actuated simultaneously, for example. As an alternative, however, these can also be controlled and thus actuated independently of one another.

In the case of multi-stage, in particular two-stage, charging, the brake flap is preferably arranged upstream of a first exhaust turbine, as seen in the direction of flow, of a first or uppermost exhaust turbocharger.

In principle, the exhaust turbine can be any suitable turbine, in particular also an exhaust turbine with variable turbine geometry (VTG charger).

Through the arrangement of the at least one brake flap upstream of and hence outside a turbine housing or an inflow duct of the exhaust turbine, the flap does not form a component of the exhaust turbine, this resulting in positioning of the brake flap for easy assembly with increased degrees of freedom in terms of design. In particular, it is then possible here to avoid structural modifications to the exhaust turbine, and there is no need to stock a large number of different turbines for different model series. According to a specific first embodiment that is particularly preferred for this purpose, the exhaust turbine, in particular a turbine housing of the exhaust turbine, can then be coupled fluidically here to an exhaust manifold, to which the exhaust gas is admitted via at least one, preferably a plurality of, cylinders of the combustion engine. A separate module having the brake flap is installed between the exhaust turbine and the exhaust manifold, in particular between a turbine housing of the exhaust turbine and the exhaust manifold and hence directly upstream of and outside a turbine housing of the exhaust turbine, the module being firmly connected both to the turbine housing and to the exhaust manifold. Here, the at least one brake flap thus forms part of a distinct, separately installed module or component with its own housing, increasing design flexibility and furthermore requiring no structural modifications to the exhaust turbine and to the exhaust manifold. In a manner which is particularly compact and advantageous in terms of construction, provision is made, according to a second specific variant embodiment, for the exhaust turbine or an exhaust turbine housing of the exhaust turbocharger to be mounted directly on an exhaust manifold, to which the exhaust gas is admitted via at least one, preferably a plurality of, cylinders of the combustion engine, wherein the brake flap is arranged in the region of the exhaust manifold and hence directly upstream of and outside a turbine housing of the exhaust turbine. This results in an arrangement which is, as before, advantageous for the operation of the exhaust turbine and, in addition, positioning of the brake flap which is easy for assembly.

As an option which is particularly advantageous in functional terms, the at least one brake flap, which is preferably of single or possibly also of multi-blade design, can be arranged in the region of a connecting flange of the housing of the separate module or of the exhaust manifold, in particular on a wall region of the housing of the separate module or of the exhaust manifold which is adjacent to the connecting flange, and hence directly upstream of and outside a turbine housing, in particular upstream of and outside an inflow duct of the turbine housing. In a specific embodiment, the brake flap is arranged pivotably in such a way, in the region of or on a connecting flange of the housing of the separate module or of the exhaust manifold leading to the exhaust turbine, that it exposes the exhaust gas cross section in the open state, preferably completely, and reduces the exhaust gas cross section in a specifically intended manner in the state in which it is closed to a greater or lesser extent. In this case, the brake flap is preferably arranged so close to the exhaust turbine or to the connecting flange thereof that, in a defined open position, in particular in the completely open state, the flap projects beyond the connecting flange into the inflow duct of the exhaust turbine, at least by a free end region, in order to in this way effectively exercise its flow guiding function as close as possible to the turbine. Here, a single-blade configuration is taken to mean a structure in which one blade projects with more or less maximum eccentricity from the pivot, which is preferably arranged at the end, thereby making it possible to influence the flow conditions significantly more effectively and with greater flexibility in comparison with centric multi-blade configurations. Moreover, the pivot of such single-blade brake flaps can be integrated into a wall section of the exhaust manifold in a manner which is particularly simple in terms of design. In principle, however, centric multi-blade configurations are also possible.

In an embodiment of the invention, in an engine braking mode, the brake flap can be controlled by a closed-loop and/or open-loop control device, i.e., by an electronic engine control unit, in a manner dependent on the exhaust gas backpressure upstream of the brake flap and/or in a manner dependent on the boost pressure in the intake system of the combustion engine. It has been found that extremely high engine braking power can be achieved in this way, wherein closed-loop control of the boost pressure is particularly relevant.

The exhaust gas backpressure can be detected by a sensor, i.e., a pressure sensor, which is arranged functionally upstream of the brake flap. Here, a functional upstream arrangement of the sensor means that the sensor does not necessarily itself have to be arranged immediately at that point but that, to reduce the thermal loading thereof, it can also be arranged remote and spaced apart therefrom, in which case the sensor is then connected to the region situated upstream of the brake flap by a line which opens into the exhaust system upstream of the brake flap. This line is preferably designed as a line which falls towards the sensor, relative to the direction of a vertical axis, this helping, for example, to prevent or at least reduce the formation of condensate, which is disadvantageous for the result of measurement by the sensor.

A sensor, in particular a pressure sensor, is furthermore preferably arranged downstream of a compressor, in the region of the intake manifold, in order to detect the boost pressure.

Moreover, actuation of the brake flap can be accomplished by a positioner or servomotor, preferably a pneumatically actuated positioner or servomotor, and a valve connected thereto, e.g., a proportional valve or a cyclically controlled valve. This arrangement allows precise control of the engine braking power that is easy to manage in terms of design or present in the vehicle in any case. As an alternative, however, actuation can also be performed by an electric actuator controlled by an open-loop and/or closed-loop control device.

In another advantageous embodiment of the invention, at least one brake signal (B), which initiates the engine braking, and/or a load signal ($\alpha$) and/or the value of the exhaust gas backpressure (PA) and/or of the boost pressure (PL) in the intake system can be fed to the open-loop and/or closed-loop control device, in particular to the electronic engine control unit, wherein at least the position of the brake flap can be controlled in accordance with the demanded engine braking power.

Exhaust gas recirculation from the exhaust system to the intake system with an exhaust gas recirculation valve, preferably controlled electrically or pneumatically, in the exhaust gas recirculation line, is provided according to an embodiment of the invention.

Finally, the decompression braking effect can be formed either by the exhaust gas backpressure or by a device which is superimposed on the valve control of the combustion engine and which is preferably electrically or pneumatically or hydraulically controlled.

Preferably, the brake flap exposes the full cross section of the outflow opening leading to the exhaust turbine in the open position and, in intermediate positions up to full closure, deflects the exhaust gas flow to the turbine rotor of the exhaust turbine in such a way that the exhaust gas flow, which is accelerated by the narrowing of the cross section, drives the turbine rotor. By such an acceleration of the exhaust gas flow the engine braking power, in the engine braking mode, can be significantly increased as the turbine rotor of the exhaust turbine is increasingly driven by the exhaust gas flow and also the boost pressure is increased.

The brake flap is, according to a further preferred embodiment, arranged, as regards its open position, in which the brake flap exposes the full cross section of the outflow opening, and/or as regards its surface, at least partially flush with the surface of a channel wall of an exhaust gas flow channel which builds the outflow opening. The brake flap is preferably received and/or arranged in a cavity of the channel wall and is, as regards its surface, aligned flush with the surface of those wall parts of the channel wall of an exhaust gas flow channel which adjoin the cavity directly respectively abut against the cavity directly. Hereby a continuous, edge free and substantially even respectively smooth wall part is achieved, which contributes in the reduction of the flow resistance and contributes to counteract a throttle effect of the brake flap.

The term "brake flap" as used in the present application should expressly be understood in a broad and comprehensive sense and is not limited only to pivotable flap arrangements. Thus, where not explained otherwise, the term "brake flap" is also expressly intended to include any other suitable and/or non-pivotable throttling devices, e.g., slides or rotary slides.

The object of the invention is also met by a method for operating an engine braking device for a combustion engine in motor vehicles, wherein the engine braking device has an intake system, an exhaust system, gas exchange valves associated with the combustion engine, an exhaust turbo charger integrated into the exhaust system and the intake system, and an engine braking unit, wherein the engine braking unit has a decompression brake, which influences at least one outlet valve of the gas exchange valves, and a brake flap, which is arranged in the exhaust system and causes the exhaust gas to build up. According to the method of the invention, the brake flap is arranged upstream of and outside, preferably directly upstream of and outside, a turbine housing of an exhaust turbine of the exhaust turbo charger. In addition the brake flap forms a flow guiding flap, which admits a defined gas flow to the exhaust turbine in accordance with the position of the brake flap.

The advantages obtained by the procedure according to the invention are identical with the already mentioned advantages of the device according to the invention. Insofar, attention is drawn to the remarks made above.

In a preferred embodiment of the method, in the engine braking mode, the brake flap is arranged in at least one defined intermediate position between an open position and a closed position, in which the brake flap exposes a defined flow cross section and in which the flow cross section, as seen in the direction of the exhaust gas flow, is reduced nozzle-like in order to accelerate the exhaust gas flow which flows over and/or past the brake flap. In the intermediate position the turbine rotor of the exhaust turbine is increasingly driven by the exhaust gas flow in the engine braking mode, and the boost pressure and also the engine braking power are increased. Preferably, the brake flap closes the exhaust gas flow channel in the closed position completely, i.e., the brake flap exposes no flow cross section.

According to another preferred embodiment, the brake flap exposes in its intermediate position a flow cross section which lies in the range of 0.1% to 20%, preferably in the range of 1% to 12%, most preferably in the range of 1.3% to 11.1%, of the maximum flow cross section. Hereby, in engine braking mode, an effective stimulation of the turbine rotor and simultaneously also a high exhaust gas brake pressure is achieved. The buildup of the boost pressure is influenced in a positive way as the flow velocity is increased with increasingly closing brake flap. On the other hand, the mass flow shouldn't be throttled too much. With the above preferred values an optimum of both effects as regards the buildup of the boost pressure is achieved.

In a further specific embodiment the brake flap exposes, in the engine non-braking mode, a first flow cross section, preferably the maximum or complete flow cross section, while the brake flap, in the engine braking mode, especially in dependence upon at least one parameter, exposes a second flow cross section which is smaller as the first flow cross section or closes the exhaust gas flow channel completely.

As regards the advantages obtained by the vehicle according to the invention, attention is drawn to the remarks made above.

BRIEF DESCRIPTION OF THE DRAWINGS

An illustrative embodiment of the invention is explained below more specifically with further details.

In the drawing:

FIG. 6 a sectional view of the exhaust turbine and the exhaust manifold with a brake flap in open position; and FIG. 7 an illustration according to FIG. 6 with the brake flap in an intermediate position.

DETAILED DESCRIPTION OF THE PREFERRED EMBODIMENTS

Figure 1:
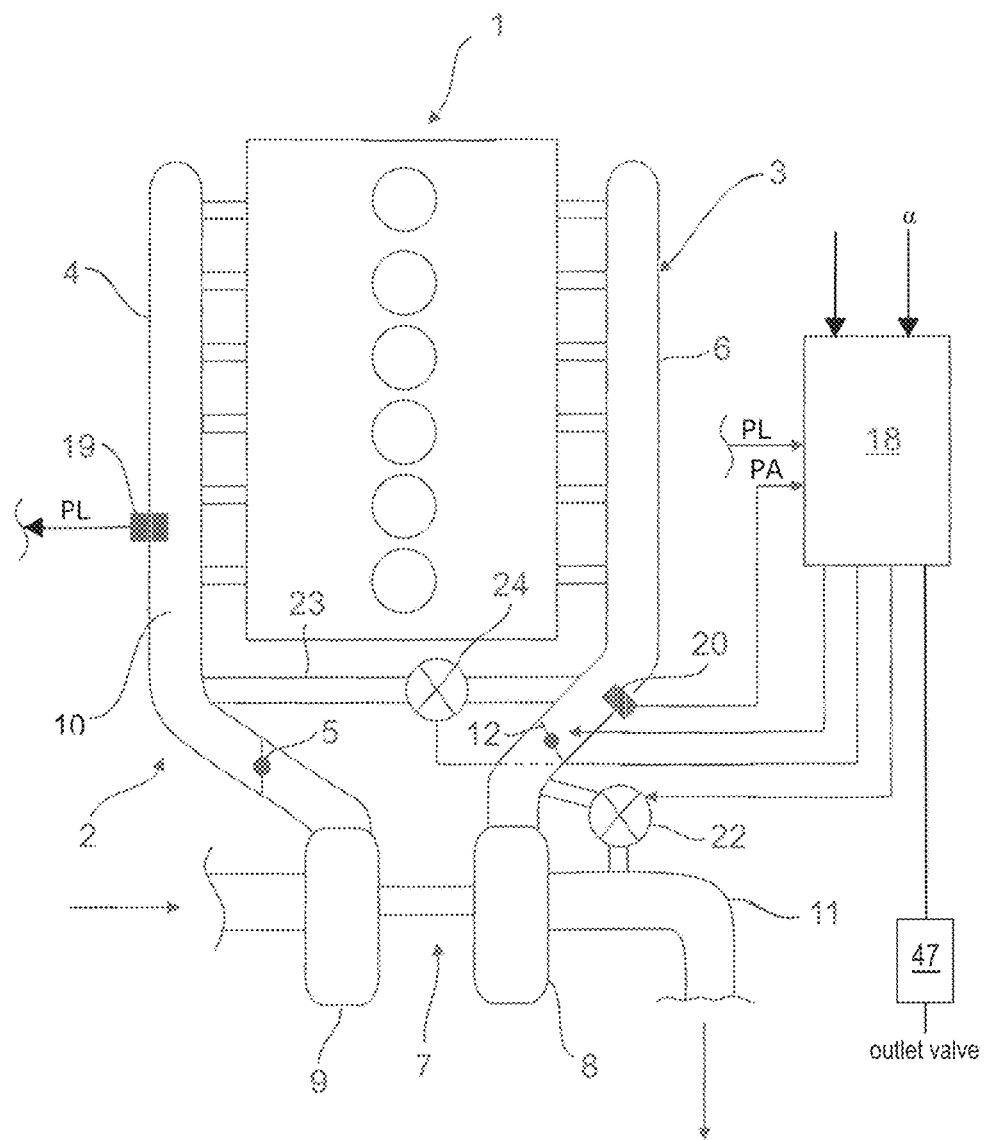
FIG. 1 shows, in a purely schematic illustration, a combustion engine for a commercial vehicle, having an intake system, an exhaust system, an exhaust turbocharger and an engine braking device having a brake flap upstream of the exhaust turbine, the flap being controlled by an electronic engine control unit.

A combustion engine 1 (e.g., a six-cylinder diesel combustion engine) for a motor vehicle, in particular for a commercial vehicle, having an intake system 2 and an exhaust system 3 (of conventional construction where not described) is shown in a purely schematic way in FIG. 1. A throttle valve 5 can optionally be provided in the intake manifold 4 of the intake system 2.

The exhaust system 3 has an exhaust manifold 6, which is connected to the combustion chambers of the combustion engine 1 and is connected in a manner which will be described below to the exhaust turbine 8 of an exhaust turbocharger 7. The exhaust turbine 8 drives a compressor 9 in a known manner, the compressor being connected to the intake manifold 4 by a line 10 and delivering combustion air at a defined boost pressure PL to the combustion chambers of the combustion engine 1. The exhaust gas flowing out via the exhaust manifold 6 and the exhaust turbine 8 is carried away further by an exhaust line 11. The other lines of the intake system 2 and of the exhaust system 3 of the combustion engine 1 in the motor vehicle are not shown.

As an engine braking device, the combustion engine 1 has a decompression brake 47, which acts on the gas exchange valves or outlet valves of the combustion engine 1. A brake flap 12, by which a defined exhaust gas backpressure PA can be produced, is furthermore provided upstream of the exhaust turbine 8.

The decompression brake can be initiated in a known manner under gas control by the increased exhaust gas backpressure PA when the brake flap 12 is at least partially closed, at which pressure "fluttering" or "valve jumping" of the outlet valves is selectively triggered (e.g. U.S. Pat. No. 8,225,769 B2), or mechanical-hydraulic opening of the outlet valves (positive control) superimposed on the valve gear, during the compression stroke of the combustion engine, can be controlled (cf U.S. Pat. No. 5,150,678).

The decompression brake may include the decompression brake disclosed in U.S. Pat. No. 8,225,769 B2 or U.S. Pat. No. 5,150,678.

Figure 2:
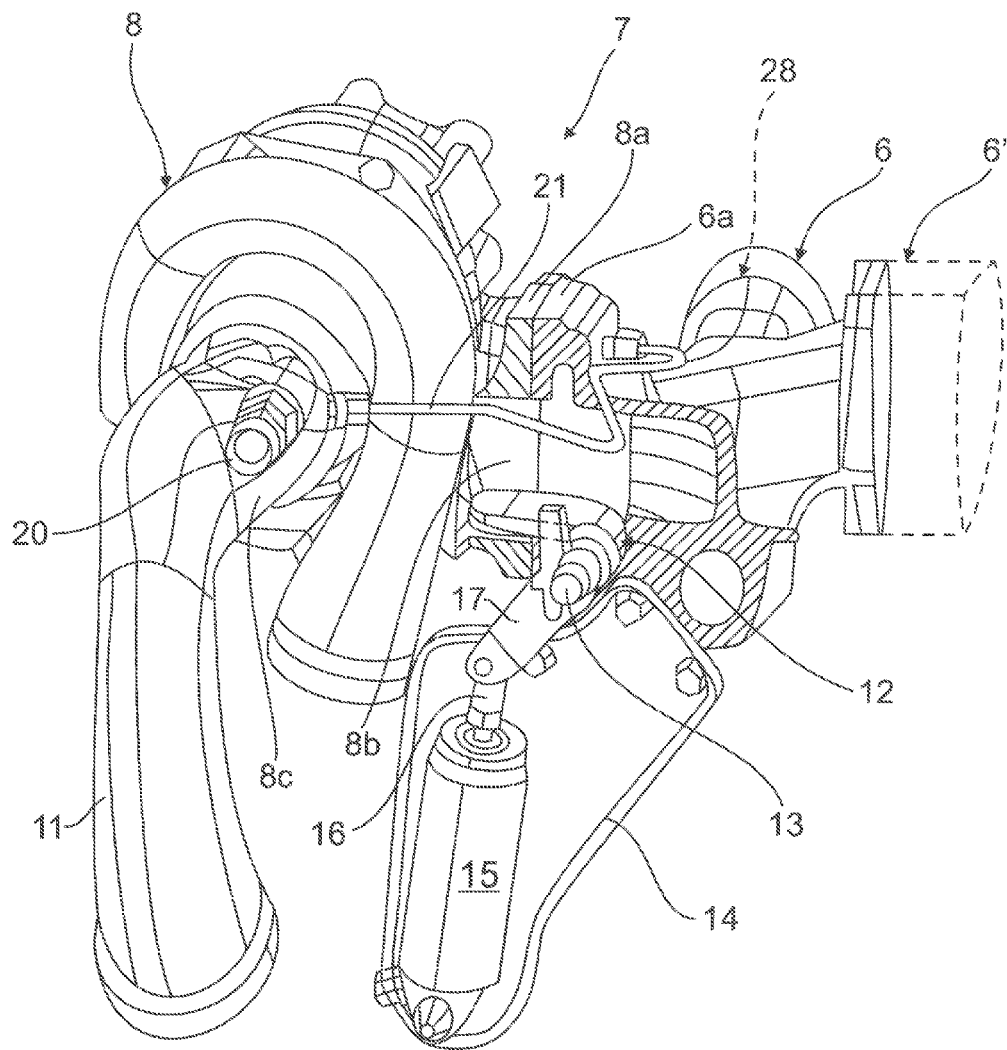
FIG. 2 shows, in a three-dimensional, partially cutaway illustration, the exhaust turbine of the exhaust turbocharger with the brake flap positioned on the exhaust manifold in the connecting region.

FIG. 2 shows a preferred embodiment of the brake flap 12, which is arranged in the exhaust manifold 6 upstream of and close to the exhaust turbine 8 of the exhaust turbocharger 7 and is pivotably mounted by a shaft 13 in the region of or on the connecting flange 6a of the exhaust manifold 6, in this case more specifically on a lower wall section of the connecting flange 6a of the exhaust manifold 6. Even though only an exhaust turbine with one flow is shown here, it is also possible, in principle, for the exhaust turbine to be of multi-flow design, e.g., of two-flow design. In this case, the flow which is the second, for example, must be imagined to be of corresponding design, with a respective brake flap 12 for each flow, wherein the brake flaps 12 can then all be controlled or actuated independently of one another or, alternatively, jointly by way of a common shaft (e.g., shaft 13).

The brake flap 12, which is here shown as a single-vane flap by way of example, that is to say a flap which is embodied with a maximum eccentricity and is secured on the rotatably mounted shaft 13, is simultaneously designed as a flow guiding element in that it exposes the full cross section of the outflow opening leading to the exhaust turbine 8 in the open position and, in intermediate positions up to full closure, deflects the exhaust gas flow to the turbine rotor (not visible) of the exhaust turbine 8 in such a way that the exhaust gas flow, which is accelerated by the narrowing of the cross section, drives the turbine rotor more powerfully, resembling the function of a variable turbine geometry, or, optionally, with pulse charging.

As is apparent from FIG. 2, which shows the open state, the brake flap 12 in this case projects by its free end region beyond the connecting flange 6a into the inflow duct 8b of the exhaust turbine 8 or the connecting flange 8a thereof, e.g., by about half the length thereof, to a point close to the turbine rotor in the completely open position shown here, in order to intensify the positively acting incident flow.

However, as an alternative to integration into the exhaust manifold 6 as just described, it is also possible for the brake flap 12 to be part of a separate module 28 having the brake flap 12, as illustrated only in an extremely schematic way and in dashed lines in FIG. 2, the module being installed between the turbine housing of the exhaust turbine 8 and the exhaust manifold 6', which then adjoins the separate module 28, and being firmly connected both to the turbine housing of the exhaust turbine 8 and to the exhaust manifold 6'. Here, the at least one brake flap 12 thus forms part of a distinct, separately installed module 28 or component with a dedicated housing. In other respects, the construction and operation are identical with that already described above.

A holder 14, which carries a control element 15 (e.g. a piston-cylinder unit), e.g. a pneumatic control element, as a positioner, by which the brake flap 12 can be actuated by way of a piston rod 16 and a lever 17, is furthermore secured on the exhaust manifold 6. The control element 15 can be actuated precisely into positions between open and fully closed by a valve (not shown) connected to a pressure medium source, e.g., by a proportional valve or a cyclically controlled valve. The use of an electric actuator would also likewise be possible in principle.

For advantageous adjustment or control of the brake flap 12 in the engine braking mode (cf also FIG. 1), an electronic engine control unit 18 is preferably provided as an open-loop and/or closed-loop control device, to which not only the usual operating parameters of the combustion engine (speed, temperature etc.) but also at least one signal B as an engine braking signal and one load signal α are preferably fed.

Moreover, the value of the boost pressure PL in the intake manifold 4 and the value of the exhaust gas backpressure PA in the exhaust manifold 6 are detected by sensors 19, 20, preferably designed as pressure sensors, and fed to the control unit 18 via corresponding signal lines.

The sensor 20, preferably a pressure sensor, in the exhaust manifold 6 is arranged functionally upstream of the exhaust turbine 8. FIG. 1 shows this in an abstract way. In the design embodiment (FIG. 2), the sensor 20 is not itself arranged immediately and directly upstream of the brake flap 12 in the exhaust manifold 6 for thermal reasons, but is arranged spaced apart and remote therefrom on a formed feature 8c of the housing and connected by a line 21 to the exhaust manifold 6 upstream of the brake flap 12. Here, this line 21 is preferably designed as a line 21 which falls towards the sensor 20 relative to the direction of a vertical axis. Of course, the formed feature 8c of the housing is cooler in the operating state than that region of the exhaust manifold 6 which lies upstream of the brake flap 12, into which line 21 opens.

The exhaust turbocharger 7 can optionally have a bypass valve 22, by which exhaust gas can be diverted past the turbine rotor of the exhaust turbine 8 in order to avoid an excessive boost pressure PL. The bypass valve 22 can be integrated directly into the exhaust turbine 8 and is therefore not visible in the illustration according to FIG. 2.

Likewise purely as an option, the combustion engine 1 can furthermore have an exhaust gas recirculation line 23 between the intake system 4 and the exhaust system 3, in which line an exhaust gas recirculation valve 24 that can be controlled by the engine control unit 18 is provided. As can be seen from FIG. 1, the opening of the exhaust gas recirculation line 23 into the exhaust manifold 6 is preferably situated upstream of the brake flap 12. The exhaust gas recirculation line 23 preferably opens into the intake manifold 4 downstream of the optional throttle valve 5.

Engine braking in the overrun mode of the motor vehicle is initiated, in particular, by the signal B and brings about defined closure of the brake flap 12 depending, inter alia, on the speed of the combustion engine and, if appropriate, on the demand for the desired braking power. Closure of the exhaust gas recirculation valve 24 can furthermore be controlled in a temperature-dependent manner, if appropriate.

The closed position of the brake flap 12 is furthermore defined by the boost pressure PL in the intake manifold 4 and the exhaust gas backpressure PA in the exhaust manifold 6 of the combustion engine.

Figure 3:
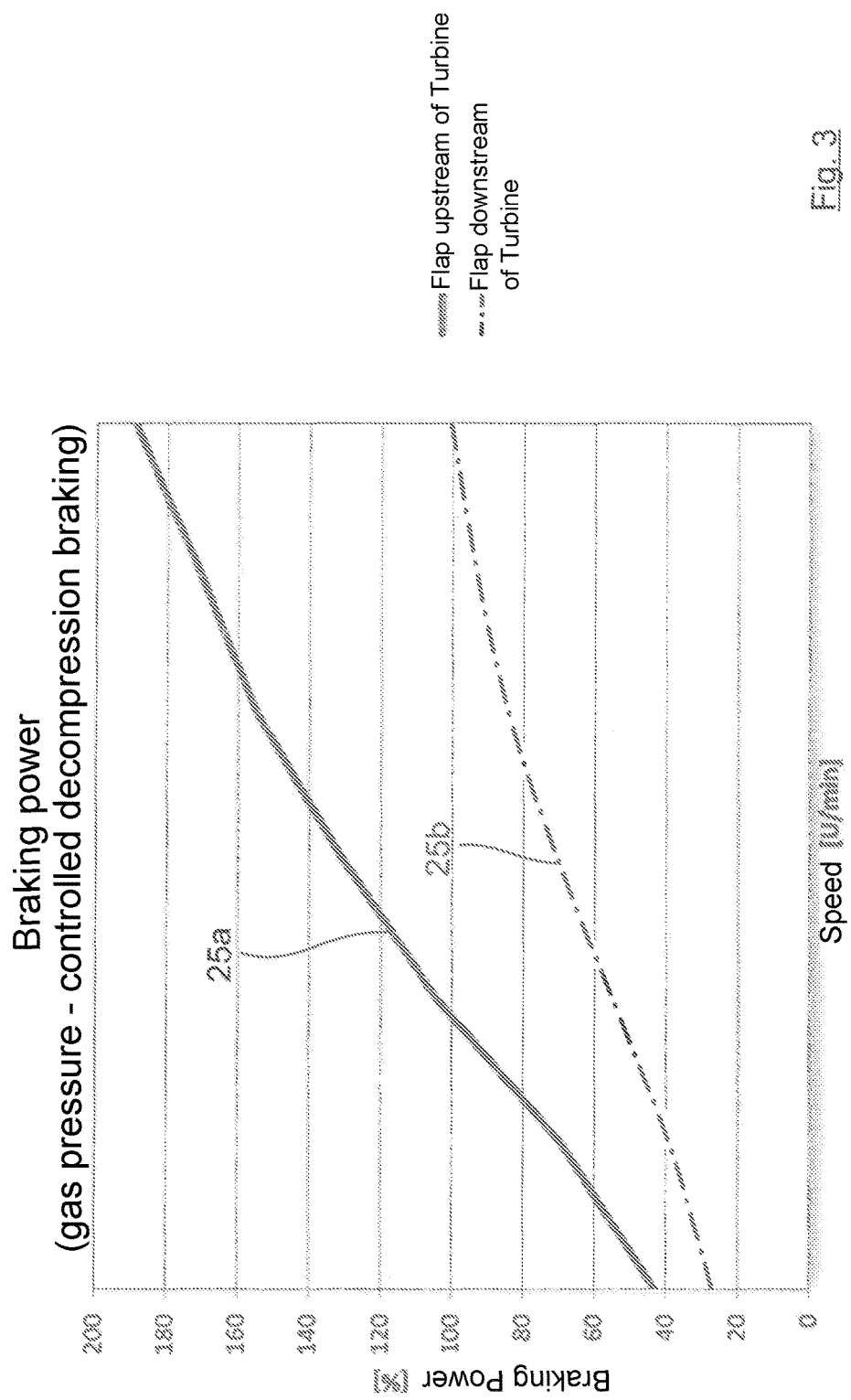
FIG. 3 shows a diagram relating to the engine braking power which can be achieved with the engine braking device according to FIGS. 1 and 2, in percent, plotted against the speed of the combustion engine.
Figure 4:
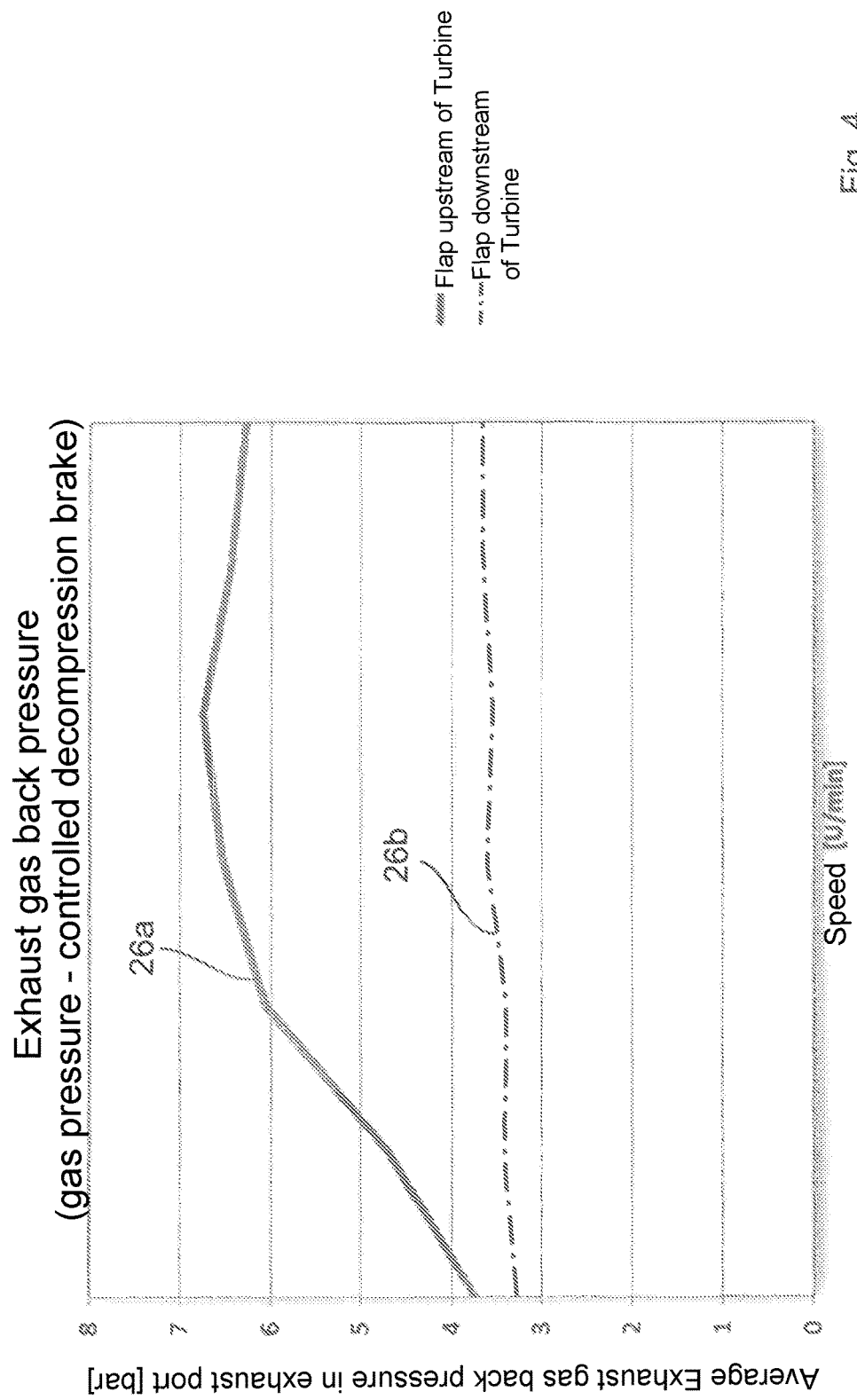
FIG. 4 shows another diagram illustrating the mean relative exhaust gas backpressure detected by a sensor, in bar.
Figure 5:
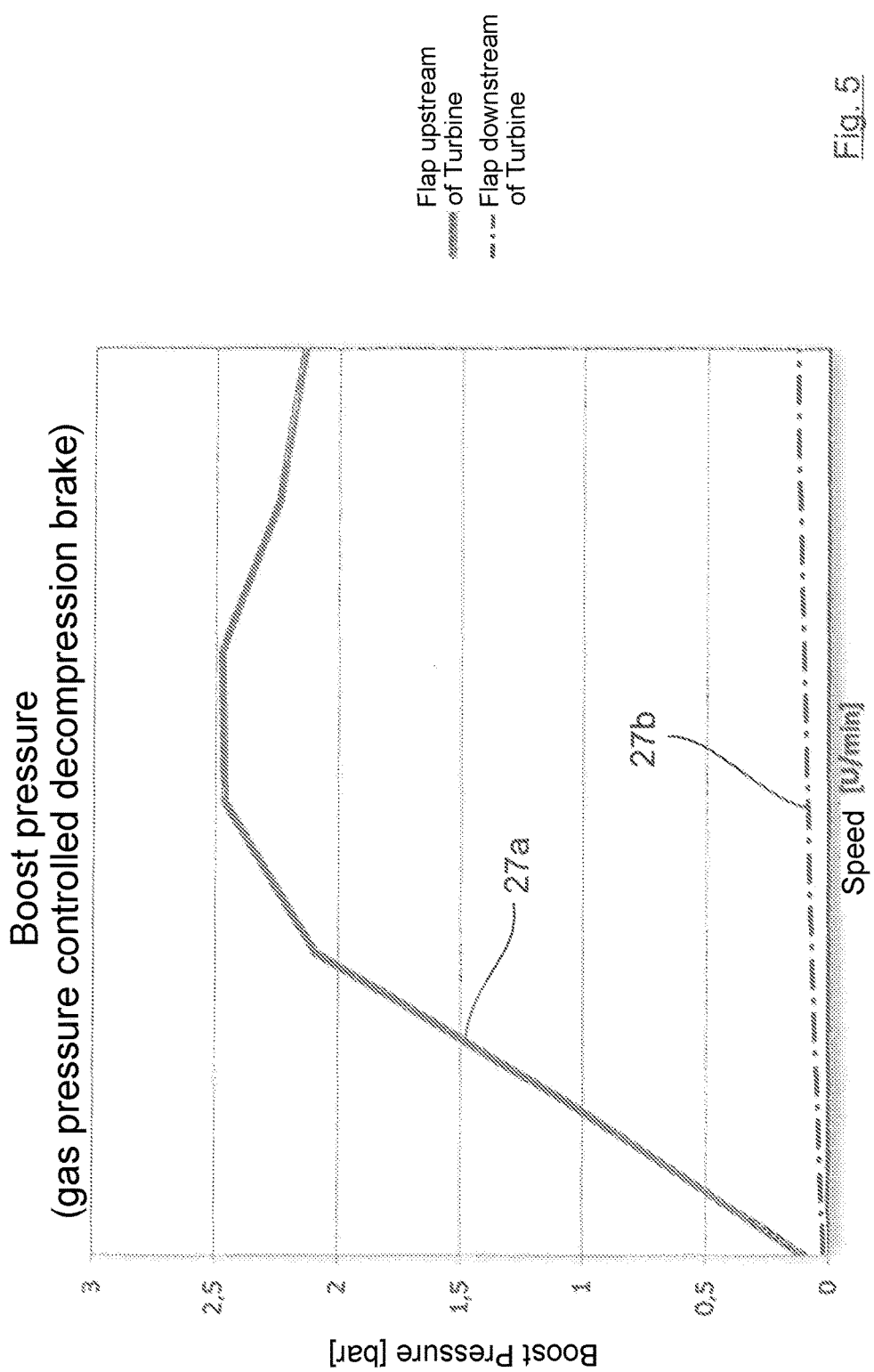
FIG. 5 a diagram showing the relative boost pressure variation (in bar) against the speed of the combustion engine.

FIGS. 3 to 5 show, in corresponding diagrams, measured values for a decompression brake, which is gas-pressure-controlled here by way of example, and a controlled brake flap 12, in each case against the speed n of the combustion engine 1 and relating to the achievable specific braking power (FIG. 3, curve 25a), the prevailing exhaust gas backpressure PA in FIG. 4 (curve 26a) and the boost pressure variation PL in FIG. 5 (curve 27a), in each case in comparison with a conventional arrangement and configuration of the brake flap 12 downstream of the exhaust turbine (curves 25b, 26b, 27b).

As can readily be seen from the diagrams, the engine braking power in the case of a combustion engine 1 according to the invention with exhaust turbocharging 7 is significantly increased (curve 25a). The same applies to the prevailing exhaust gas backpressure (curve 26a).

Moreover, both curves 25a, 26a based on the solution according to the invention each have steeply rising gradients.

However, what is particularly noteworthy and crucial to the significant increase in specific engine braking power (curve 25a) is the steeply rising boost pressure PL (curve 27a), even at low speeds n of the combustion engine 1, obtained through the brake flap 12 according to the invention with corresponding flow guiding function.

As the diagrams clearly show, the significantly increased exhaust gas backpressure means that a significantly higher engine braking power is achieved with the brake flap arrangement according to the invention upstream of the exhaust turbine in comparison with a brake flap arranged downstream of the exhaust turbine, while there is no higher thermal loading of the combustion engine despite the significantly increased engine braking power.

Although the measured values were determined on a combustion engine 1 having a gas-pressure-controlled decompression brake, they are also equally relevant or valid for combustion engines 1 featuring exhaust turbocharging and the use of a positively controlled decompression brake.

FIGS. 6 and 7 show a sectional view of the exhaust manifold 6 and the exhaust turbine 8 of the exhaust turbocharger 7, by which the mode of operation is explained in further detail. FIG. 6 shows the brake flap 12 in the open position 29, in which the brake flap 12 is arranged in the normal mode respectively in the engine non-braking mode. In the open position 29 the brake flap 12 exposes, by way of example, the full respectively the maximum flow cross section $Q_{max}$ of an exhaust gas flow channel 30 being formed by the exhaust manifold 6 and the exhaust turbine 8. The exhaust gas flow channel 30 further forms the outflow opening.

The brake flap 12 is received and/or arranged in a cavity 31 of a channel wall 32 of the exhaust gas flow channel 30 in such a way that the brake flap 12, as regards its surface, is aligned flush with the surface of those wall parts 33 of the channel wall 32 of the exhaust gas flow channel 30 which adjoin the cavity 31 directly. Hereby, a continuous transition between the wall parts 33 of the channel wall 32 is achieved in order to ensure a particular low flow resistance. The cavity 31 has, by way of example, an area 34, which is part of the exhaust manifold 6, and an area 35, which is part of the exhaust turbine 8.

In FIG. 6 a closed position 36 of the brake flap 12 is schematically shown with dashed lines 36. The brake flap 12 is arranged in the closed position in the engine braking mode for example. In the closed position, the brake flap 12 blocks the exhaust gas flow channel 30 completely such that the exhaust gas builds up at most. The brake flap 12 lies in the closed position, by way of example only, with a free end portion 37 in a cavity 38 of the channel wall 32. The cavity 38 is, by way of example, formed in a wall portion 39a of the channel wall 32, which is opposite to a fixing portion 39 of the brake flap 12. Furthermore the cavity 38 is arranged, by way of example, at a side of the exhaust manifold 6. Alternatively it would be possible to arrange the cavity 38 on the side of the exhaust turbine 8.

Furthermore, the cavity 38 is adapted to the contour of the end portion 37 of the brake flap 12 in such a way that the end portion of the brake flap 12, in the closed position 36, is in plane contact with a cavity wall portion 40, which forms the cavity 38. Thereby, the exhaust gas builds up effectively in the closed position 36 of the brake flap 12. Furthermore, the cavity 38 is arranged, as seen in the direction of flow of the exhaust gas, downstream of a measuring point 41 of the pressure sensor 20.

FIG. 7 shows the brake flap 12 in an intermediate position 42 between the open position 29 and the closed position 36. In the intermediate position the brake flap 12 is arranged, by way of example, in the engine braking mode. In the intermediate position 42 the brake flap 12 exposes a flow cross section $Q_Z$ which is smaller than the maximum flow cross section $Q_{max}$. Furthermore, the brake flap 42 is arranged in the intermediate position 42 in such a way that the flow cross section of exhaust gas flow channel 30, as seen in the direction of flow, is reduced nozzle-like in order to accelerate the exhaust gas flow, which flows over and/or past the brake flap 12. Thereby, a turbine rotor 43 of the exhaust turbine 8 is driven by the exhaust gas flow in the engine braking mode, whereby the boost pressure and also the engine breaking power is increased.

Preferably, the brake flap 12, in its intermediate position 42, exposes 0.1% to 20%, most preferably 1.3% to 11.1%, of the maximum flow cross section $Q_{max}$, in order to ensure, in the engine braking mode, an effective impulse on the turbine rotor 43 and simultaneously also a high exhaust gas back pressure.

LIST OF REFERENCE SIGNS 1 combustion engine
2 intake system
3 exhaust system
4 intake manifold
5 throttle valve
6 exhaust manifold
6a connecting flange
7 exhaust turbocharger
8 exhaust turbine
8a connecting flange
8b inflow duct
8c formed feature
9 compressor
10 intake line
11 exhaust line
12 brake flap
13 shaft
14 holder
15 control element
16 actuating piston
17 lever
18 engine control unit 19 pressure sensor
20 pressure sensor
21 line
22 bypass valve
23 exhaust gas recirculation line
24 exhaust gas recirculation valve
25 curve for the braking power
26 curve for the exhaust gas backpressure PA
27 curve for the pressure PL
28 separate module
29 open position
30 exhaust gas flow channel
31 cavity
32 channel wall
33 wall portion
34 portion on the side of the exhaust manifold
35 portion on the side of the exhaust turbine
36 closed position
37 end portion
38 cavity
39 fixing portion
39a wall portion
40 cavity wall portion
41 measuring point
42 intermediate position
43 turbine rotor
$Q_{max}$ maximum flow cross section
$Q_z$ flow cross section intermediate position

The invention claimed is:

1. A method for operating an engine braking device for a combustion engine in motor vehicles, the engine braking device having an intake system, an exhaust system, gas exchange valves associated with the combustion engine, an exhaust turbocharger integrated into the exhaust system and the intake system, and an engine braking unit, wherein the engine braking unit has a decompression brake, which influences at least one outlet valve of the gas exchange valves, and a brake flap, which is arranged in the exhaust system and movable between an open position defining a maximum flow cross-section and a closed position the brake flap being controllable to cause causes the exhaust gas to build up, the method comprising:

arranging the brake flap in an exhaust gas flow channel that forms an outflow opening leading to a turbine housing of an exhaust turbine of the exhaust turbocharger so that the brake flap forms a flow guiding flap, and controlling, by a controller, a position of the brake flap to admit a defined gas flow to the exhaust turbine in accordance with the position of the brake flap, wherein the step of controlling includes controlling the brake flap in an engine non adjusting the brake flap to an intermediate position between the open position and the closed position in an engine braking mode in which the brake flap exposes a second flow cross-section of the exhaust gas flow channel that is smaller than the first the maximum flow cross-section, and the second flow cross-section, as seen in the direction of the exhaust gas flow, is reduced nozzle-like in order to accelerate the exhaust gas flow which flows past the brake flap, wherein the second flow cross-section lies in the range of 0.1% to 20% of the maximum flow cross-section, and wherein the exhaust gas flowing past the brake flap in the exhaust gas flow channel is directed to the turbine rotor.

2. The method according to claim 1, wherein the brake flap in the intermediate position exposes the second flow cross-section through the exhaust gas flow channel which lies in the range of 1% to 12% of the maximum flow cross section.

3. The method according to claim 1, wherein the brake flap in the intermediate position exposes the flow cross-section through the exhaust gas flow channel which lies in the range of 1.3% to 11.1%, of the maximum flow cross section.

* * * * *